(12) United States Patent
Harrison et al.

(10) Patent No.: US 12,366,466 B2
(45) Date of Patent: Jul. 22, 2025

(54) OVER TRAVEL DETECTION DEVICE

(71) Applicant: Goodrich Actuation Systems Limited, Solihull (GB)

(72) Inventors: Colin Roger Harrison, Wolverhampton (GB); Philip Wadge, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 364 days.

(21) Appl. No.: 17/866,714

(22) Filed: Jul. 18, 2022

(65) Prior Publication Data
US 2023/0027707 A1    Jan. 26, 2023

(30) Foreign Application Priority Data

Jul. 21, 2021   (EP) .................................... 21275098

(51) Int. Cl.
- *G01D 5/22* (2006.01)
- *F16D 65/14* (2006.01)
- *G01D 5/347* (2006.01)

(52) U.S. Cl.
CPC ............ *G01D 5/2291* (2013.01); *F16D 65/14* (2013.01); *G01D 5/34738* (2013.01)

(58) Field of Classification Search
CPC ........ F16D 65/14; G01D 5/2291; G01D 3/08; G01D 5/34738; G01D 5/14
See application file for complete search history.

(56) References Cited

U.S. PATENT DOCUMENTS

| | | | |
|---|---|---|---|
| 4,567,467 A | 1/1986 | Wiblin et al. | |
| 4,678,991 A | 7/1987 | Schmidt | |
| 5,150,624 A | 9/1992 | Kaczmarek et al. | |
| 5,793,201 A | 8/1998 | Nelle et al. | |
| 7,729,849 B2 * | 6/2010 | Zanotti ................ | B62K 11/14 |
| | | | 324/207.25 |

(Continued)

FOREIGN PATENT DOCUMENTS

| CN | 201488722 U | 5/2010 |
|---|---|---|
| CN | 105947911 A | 9/2016 |

(Continued)

OTHER PUBLICATIONS

German Patent No. DE 102018131708 to Zhou published on Jun. 18, 2020.*

(Continued)

*Primary Examiner* — Pamela Rodriguez
(74) *Attorney, Agent, or Firm* — CANTOR COLBURN LLP

(57) ABSTRACT

A system for detecting rotational over travel includes: an angular position sensor comprising a rotor rotatable about an axis, the angular position sensor configured to output one or more electrical signals to indicate an angular position of the rotor about the axis and/or a number of turns completed by the rotor about the axis; and a device comprising a first operating mode and a second operating mode and configured to transition from the first operating mode to the second operating mode in response to the rotor rotating beyond at least one angular position threshold, wherein the transition from the first operating mode to the second operating mode is independent of the one or more electrical signals.

10 Claims, 4 Drawing Sheets

(56) References Cited

U.S. PATENT DOCUMENTS

| | | | |
|---|---|---|---|
| 10,422,659 B2 | 9/2019 | Smith | |
| 2009/0251089 A1* | 10/2009 | O'Gorman | H02P 6/18 |
| | | | 318/400.33 |
| 2018/0245704 A1 | 8/2018 | Narita | |

FOREIGN PATENT DOCUMENTS

| | | |
|---|---|---|
| DE | 102010043939 A1 | 5/2012 |
| JP | S56160613 A | 12/1981 |
| JP | H07311007 A | 11/1995 |

OTHER PUBLICATIONS

WO document No. WO 2019/219599 to Zang et al published on Nov. 21, 2019.*
German Patent No. DE 102022108718 to Labahn published on Oct. 12, 2023.*
Translation of German Patent No. DE 102010043939 obtained from website: https://worldwide.espacenet.com on Oct. 3, 2024.*
Translation of Japanese Patent No. JPS 56160613 obtained from website: https://worldwide.espacenet.com on Oct. 3, 2024.*
Abstract for CN105947911 (A), Published on Sep. 21, 2016, 1 page.
Abstract for CN201488722 (U), Published: May 26, 2010, 1 page.
Abstract for DE102010043939 (A1), Published on May 16, 2012, 1 page.
Abstract for JPS56160613 (A), Published on Dec. 10, 1981, 1 page.
European Search Report for Application No. 21275098.8, mailed Jan. 18, 2022, 10 pages.

* cited by examiner

OVER TRAVEL DETECTION DEVICE

CROSS-REFERENCE TO RELATED APPLICATIONS

This application claims priority to European Patent Application No. 21275098.8 filed Jul. 21, 2021, the entire contents of which is incorporated herein by reference.

TECHNICAL FIELD

This disclosure relates to systems for detecting over travel of a rotary component and systems for preventing over travel of a rotary component. This disclosure also relates to a method of detecting over travel of a rotating component.

BACKGROUND

Angular position sensors such as rotational variable differential transformers (RVDTs) and resolvers are used to detect the angular positions of rotary components, such as rotating shafts. These sensors convert the mechanical rotation of a rotary component into electronic signals that can be transmitted to a central control system.

An RVDT has an iron core which rotates between stator coils to generate a variable amplitude output signal dependent on the angular position of the core. A resolver uses the relative rotation between rotor and stator coils to determine the angular position of a rotor based on the amplitude of induced voltages. The construction and general operational principles of angular position sensors such as RVDTs and resolvers will be understood by the skilled person.

The sensors provide feedback that allows the operation of a rotary component to be controlled and monitored, for example to detect faults such as the component rotating beyond its range of normal travel, i.e., "over travel". An over travel event may be caused by a fault in the driving mechanism that causes the component to rotate, or by an error in the central control system that controls the rotation of the component.

Ideally, the central control system would receive the readings from the angular position sensor indicating an over travel event, and correct or communicate the error. However, a malfunction in the central control system could result in a failure to recognise or communicate an over travel event in spite of this being indicated by the sensor readings. Such a malfunction would allow over travel of the rotary component to continue, which could cause further issues within the overall system.

For example, an angular position sensor may be used to measure the angular position of aircraft leading edge droop slats or flaps. An error in the flight control computer could lead to the leading edge droop being driven beyond the range of normal travel. If the flight control computer does not recognise that the over travel is occurring, this will continue and could have a substantial effect on the operation of the aircraft. Accordingly, a need exists to improve the ability to detect over travel in rotating systems.

The angular position sensors would be operated through multiple connectors to the central control system. For example, RVDTs and resolvers require multiple wires to connect the coils to the central control system for supplying power and receiving feedback signals. Generally, the central control system would receive the raw signals from the coils and then convert these signals into angular position readings. In the example of the aircraft leading edge, the angular position sensor would require multiple wires extending along the wings of the aircraft to the centralised flight control computer. It would be advantageous to reduce the number of connections needed between the sensor and the flight control computer for a more compact system with reduced wiring requirements.

SUMMARY

In an aspect of the present invention, a system for detecting rotational over travel is provided. The system comprises an angular position sensor comprising a rotor rotatable about an axis, the angular position sensor configured to output one or more electrical signals to indicate an angular position of the rotor about the axis and/or a number of turns completed by the rotor about the axis. The system also comprises a device comprising a first operating mode and a second operating mode and configured to transition from the first operating mode to the second operating mode in response to the rotor rotating beyond at least one angular position threshold, wherein the transition from the first operating mode to the second operating mode is independent of the one or more electrical signals (e.g., the angular position of the rotor provided by the one or more electrical signal has no effect on the operating mode of the device). The first operating mode of the device corresponds to the rotor having an angular position that has not exceeded the angular position threshold. The second operating mode of the device corresponds to the rotor having an angular position that has exceeded the angular position threshold. The angular position sensor may be a rotary variable differential transformer or a resolver.

The device may comprise at least one switch, the at least one switch comprising a first state corresponding to the first operating mode and a second state corresponding to the second operating mode, and arranged such that the rotor can change the at least one switch from the first state to the second state when the rotor rotates beyond the at least one angular position threshold.

The at least one switch may comprise a first switch arranged such that the rotor can change the first switch from the first state to the second state when the rotor rotates beyond a first angular position threshold, and a second switch arranged such that the rotor can change the second switch from the first state to the second state when the rotor rotates beyond a second angular position threshold.

The angular position sensor may be a resolver and the rotor may comprise at least one slot configured to change the at least one switch from the first state to the second state when the at least one slot and at least one switch are rotationally aligned.

The at least one switch may comprise a mechanical switch configured to change from the first state to the second state through contact with the rotor. The at least one switch may comprise an optical switch.

In the second operating mode, the device may be configured to transmit or vary a signal to indicate that the rotor has rotated beyond the at least one angular position threshold.

The signal may be an electrical signal and, in the second operating mode, the device may be configured to increase or decrease a voltage of the signal beyond a voltage threshold to indicate that the rotor has rotated beyond the at least one angular position threshold.

The system may further comprise a power supply arranged to generate the signal.

In another aspect of the present invention, a system for preventing over travel of a rotary component is provided. The system comprises the above system for detecting rotational over travel and a braking device for preventing rotation of a rotary component, wherein the braking device is in communication with the device for receiving the signal, and is configured to be activated in response to the transmission or variation of the signal.

In another aspect of the present invention, a rotary system for preventing over travel is provided. The rotary system comprises a shaft configured to rotate about a longitudinal axis, and the above system for preventing over travel of a rotary component. The rotor is configured to be driven by the shaft such that the one or more electrical signals indicate an angular position of the shaft about the longitudinal axis and/or the number of turns completed by the shaft about the longitudinal axis. When activated, the braking device stops or slows rotation of the shaft.

In another aspect of the present invention, a system for detecting rotational over travel is provided. The system comprises a rotary component and a control system for controlling the rotation of the rotary component, and an angular position sensor configured to detect an angular position of the rotary component and output the angular position to the control system. The angular position sensor comprises a processor that is independent of the control system, the processor configured to receive the detected angular position, determine if the angular position is outside a predetermined range, and transmit or vary a signal if the angular position is outside the predetermined range, wherein the signal is independent of any commands generated by the control system.

The system may further comprises a braking device in communication with the processor, the braking device configured to be activated by the transmission or variation of the signal to stop or slow rotation of the rotary component independently of the control system.

In another aspect of the present invention, a method of detecting over travel of a rotating component is provided. The method comprises: detecting an angular position of the component and/or a number of turns completed by the rotating component using an angular position sensor, wherein the angular position sensor comprises a rotor driven by the rotating component; outputting, with the angular position sensor, one or more electrical signals indicating the angular position of the component; and transitioning a device from a first operating mode to a second operating mode in response to the rotor being driven by the rotating component beyond at least one angular position threshold, wherein the transition from the first operating mode to the second operating mode is independent of the one or more electrical signals.

The method may further comprise changing at least one switch from a first state to a second state when the component rotates beyond the at least one angular position threshold, the first state corresponding to the first operating mode and a second state corresponding to the second operating mode.

The method may further comprise, in the second operating mode, the device transmitting or varying a signal to indicate that the component has rotated beyond the at least one angular position threshold, and, optionally, activating a brake to stop or slow rotation of the component in response to the transmission or variation of the signal.

In another aspect of the present invention, a method of detecting over travel of a rotating component is provided. The method comprises controlling the rotation of the component using a control system, and detecting an angular position of the component and/or a number of turns completed by the component using an angular position sensor, wherein the angular position sensor comprises a processor that is independent of the control system, and wherein the processor receives the detected angular position, determines if the angular position is outside a predetermined range, and outputs an over travel signal if the angular position is outside the predetermined range, wherein the output of the over travel signal is independent of any commands generated by the control system.

BRIEF DESCRIPTION OF DRAWINGS

One or more non-limiting examples will now be described, by way of example only, and with reference to the accompanying figures in which.

DETAILED DESCRIPTION

Figure 1:
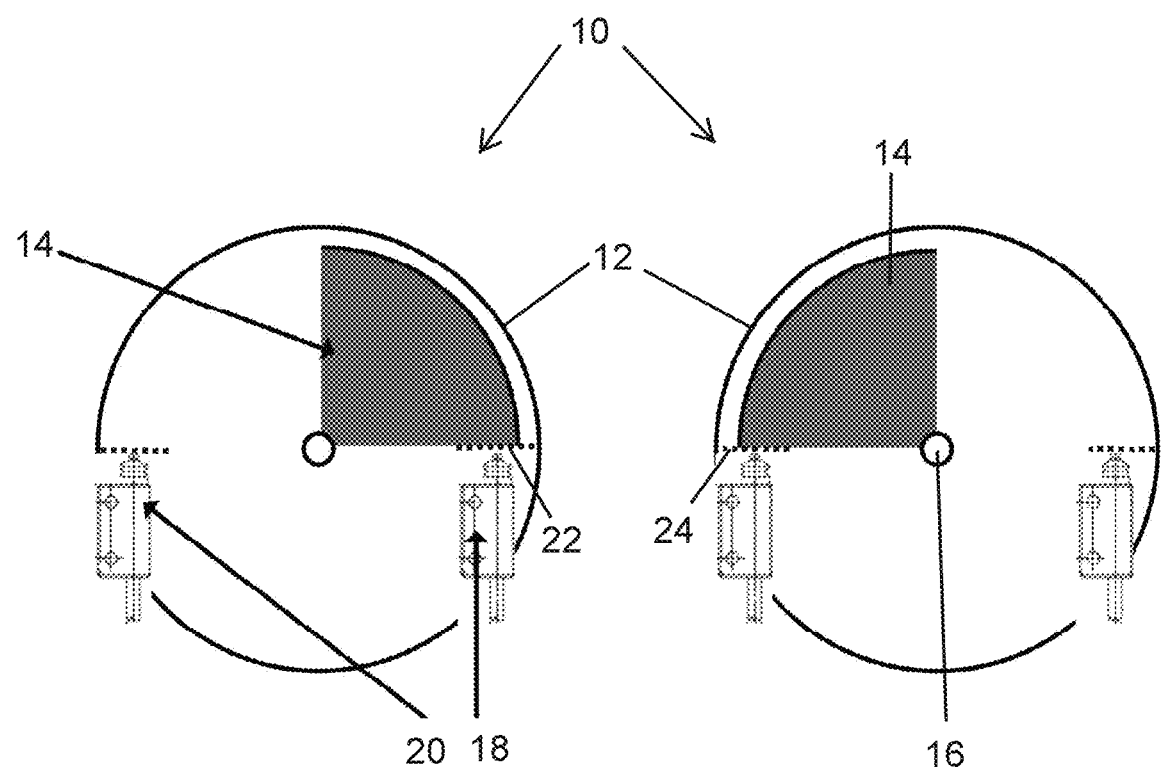
FIG. 1 is a schematic representation of a system for detecting over travel according to an embodiment of the present invention.

Referring to FIG. 1, a system 10 for detecting over travel is shown in accordance with an embodiment of the present disclosure. The system 10 comprises an angular position sensor 12 and switches 18, 20 arranged within the angular position sensor 12. In this embodiment, the angular position sensor is an RVDT 12 comprising a rotor 14, i.e. a core, coupled to a rotary component (not shown). The rotary component may be a shaft of an aircraft, for example a shaft which controls the leading edge droop of the aircraft wings, whereby the RVDT 12 would measure the angle of the leading edge droop. Embodiments of the present disclosure may be used in any rotating system with limits on angular position or number of turns that should not be exceeded.

The system 10 comprises a device configured to transition from a first operating mode to a second operating mode in response to the rotor 14 rotating beyond at least one angular position threshold 22, 24. The transition of the device between operating modes enables the detection of rotational over travel independent of the angular position measured by the angular position sensor 12. In the depicted embodiment, the device comprises the switches 18, 20 arranged within the RVDT 12.

The RVDT 12 may be coupled to the rotary component through one or more gears to translate the rotation of the rotary component into a rotation of the RVDT rotor 14 about the axis 16 within a predetermined angular sensing range of the RVDT 12. The rotation of the RVDT rotor 14 generates an electrical signal with varying amplitude depending on the angular position of the rotor 14. This electrical signal can be received by a central control system to monitor and/or control the rotation of the rotary component.

FIG. 1 shows that the rotor 14 of the RVDT 12 can rotate through about a 90° arc between two angular positions, or angular position thresholds, 22, 24. The amount of travel of the rotor 14 between the angular positions 22, 24 represents the normal travel of the rotary component, which may be translated through one or more gears. The normal travel may be the angular position range or number of turns that the rotary component should be limited to or controlled within in normal use.

If the rotary component rotates beyond its normal travel, this causes the rotor 14 to rotate beyond at least one of the angular positions 22, 24. Any amount of arc within the angular sensing range of the RVDT 12 may be used for the normal travel of the rotary component. Different RVDTs may be used with different operational ranges as appropriate for the specific applications.

Switches 18, 20 are positioned at the angular positions 22, 24 so that the rotor 14 changes the state of a switch 18, 20 when the rotor 14 is rotated beyond the corresponding angular position 22, 24 to indicate over travel of the rotary component. The state of a switch 18, 20 may correspond to an operating mode of the switch 18, 20, such that changing the state of a switch 18, 20 from a first state to a second state causes the switch to transition from a first operating mode to a second operating mode, for example, "on" and "off" modes.

Two switches 18, 20 are shown in the embodiment of FIG. 1. However, the system 10 may alternatively use just one switch, for example to detect over travel in just one rotational direction. Each switch 18, 20 may be any type of contact or non-contact switching device that can be activated by the rotation of the rotor 14 to transition from a first operating mode to a second operating mode. For example, a mechanical switch, such as a microswitch, or an optical switch may be used with the RVDT to detect over travel. The state of the switch 18, 20 may be changed by the rotor 14 coming into contact with the switch 18, 20, or by the rotor 14 coming into contactless proximity with the switch 18, 20.

The states and operating modes of the switches 18, 20 are independent of the electrical signal that is generated by the RVDT 12 to indicate the angular position of the rotary component and is received, for example, by a central control system to monitor and/or control the rotation of the rotary component. This may be achieved by having no electrical connection between the switches 18, 20 and the output of the RVDT 12. This means that the system 10 allows independent detection of rotational over travel that is protected from errors/malfunctions in the receiving and processing of the angular position electrical signal, for example by a central control system.

Figure 2:
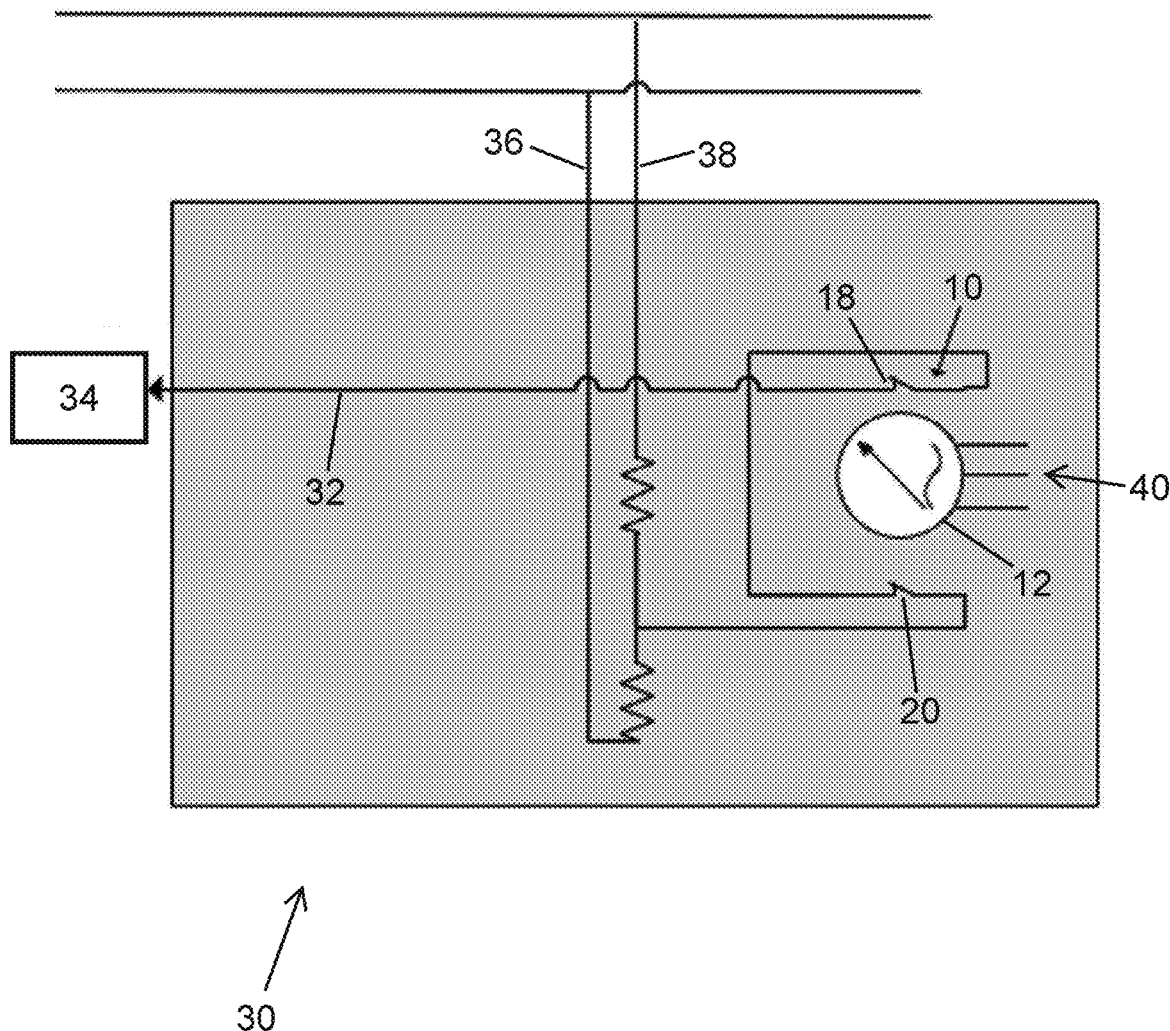
FIG. 2 is a schematic representation of a system for preventing over travel comprising the device of FIG. 1.

FIG. 2 shows a system 30 for preventing over travel of a rotary component. The system 30 includes the over travel detection system 10 of FIG. 1 and a signal line 32 which allows the system 10 to communicate the over travel condition to a secondary device 34. The secondary device 34 may be activated and/or generate a command when the system 10 indicates that over travel is occurring, for example in order to prevent subsequent over travel. The device 34 may provide a stopping function to prevent further rotation of the rotary component, such as an electrically operated lock or brake 34 associated with the rotary component. The device 34 may be any other device which can use the detection of over travel.

The system 30 may be arranged so that the device 34 causes a braking force to be applied when the system 10 detects over travel of the rotary component in order to prevent further rotation of the rotary component. For example, where the system 30 is used on an aircraft, the device 34 may be an outboard brake or wing tip brake. The device 34 may be independent of any system used to control the rotation of the rotary component.

The over travel detection system 10 communicates the over travel condition to the secondary device 34 by using the change in state of a switch 18, 20 to change a state of the signal line 32, such as a voltage on the signal line 32.

In the example of FIG. 2, power is supplied to the device 34 through the signal line 32, one or both of the supply lines 36, 38, and the switches 18, 20. Changing the state of one of the switches 18, 20, e.g., activating or deactivating a switch 18, 20, causes a change in the voltage on the signal line 32. This may be used to activate the device 34, such as triggering a brake. For example, the device 34 may be a brake for the rotary component that is arranged to apply a braking force when the voltage supplied through the signal line 32 drops below a threshold value, or drops to zero.

When no over travel is detected, both switches 18, 20 may be in a state, e.g., a closed state, that enables a voltage to be supplied to the brake 34 along the signal line 32 to prevent the brake 34 being applied. If the voltage supply to the brake 34 drops below a threshold value due to one of the switches 18, 20 changing state, such as the switch 18, 20 opening, when the rotor 14 rotates too far, the brake 34 is applied to the rotary component to stop over travel.

Alternatively, application of the brake 34 may require the supply of a voltage above a threshold value via the signal line 32, and over travel of the rotary component changes the state of a switch 18, 20 to increase the voltage on the signal line 32 above the threshold value so that the brake 34 is applied.

The switches 18, 20 may be used to change the state of the signal line in other ways. For example, the signal line 32 may be a fibre optic cable, and changing the state of the signal line 32 may comprise changing the optical signal that is sent from the system 10 to the secondary device 34 along the fibre optic cable. An optical signal may be initiated or terminated by the change in state of a switch 18, 20.

The system 30 and the communication between the over travel detection system 10 and the secondary device 34 are independent of the angular position feedback from the angular position sensor 12, such as via the connections 40 shown in FIG. 2. The state of the signal line 32, such as the voltage on the signal line 32, determined by the states of the switches 18, 20 is therefore independent of the angular position output signal of the sensor 12 that indicates the detected angular position of the rotational component. The angular position of the rotor 14 provided by the electrical signal has no effect on the voltage change on the signal line 32. Connections 40 may allow the sensor 12 to communicate with a central control system that controls the rotation of the rotary component, such as a flight control computer on an aircraft.

This provides an over travel detection and prevention capability that is independent of the central control system and is thereby protected from errors/malfunctions in the central control system.

Figure 3:
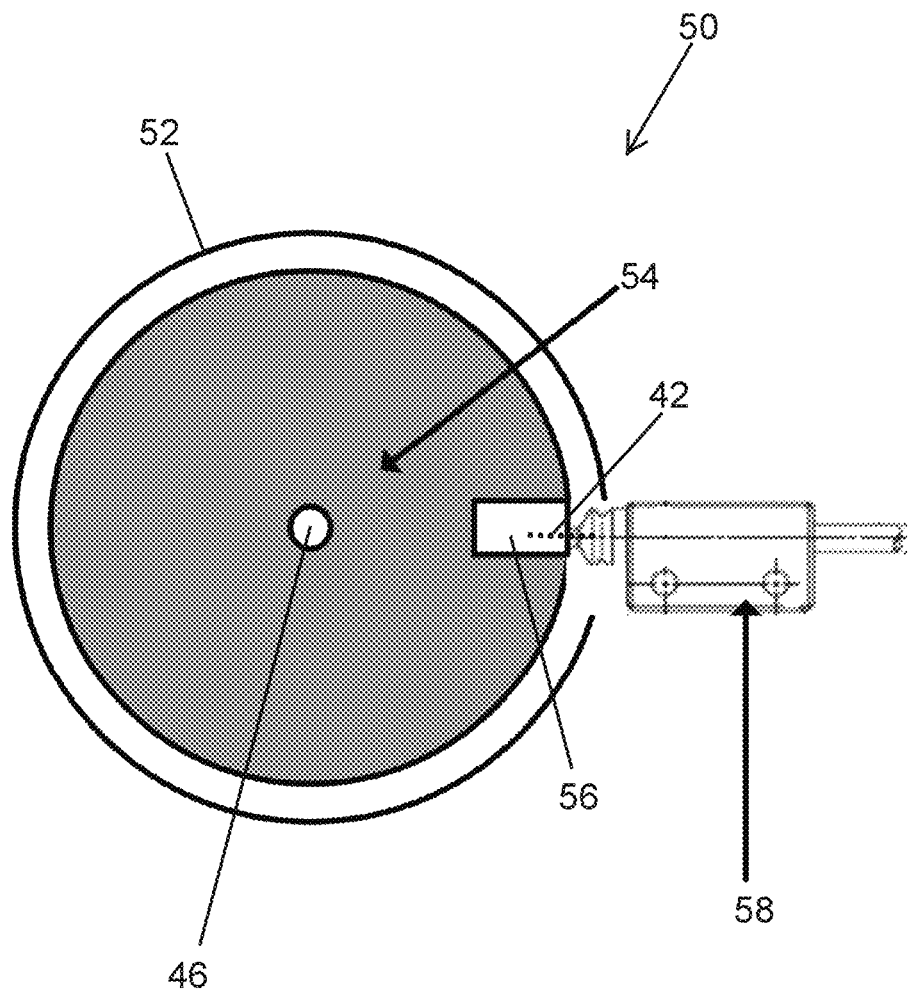
FIG. 3 is a schematic representation of a system for detecting over travel according to another embodiment of the present invention.

Referring now to FIG. 3, another system 50 for detecting over travel is shown in accordance with another embodiment of the present disclosure. The system 50 can be used in place of the system 10 in the over travel prevention system 30 of FIG. 2. This embodiment is similar to the embodiment of FIG. 1, but the RVDT 12 has been replaced with a resolver 52 as the angular position sensor, and the device configured to transition from a first operating mode to a second operating mode comprises a single switch 58, instead of the two switches 18, 20 of the RVDT 12.

The switch 58 can be activated or deactivated by the presence or passage of a slot 56 in the rotor 54 of the resolver 52 as the rotor 54 rotates about the axis 46. The switch 58 is arranged at an angular position 42 with respect to the rotor 54 so that when the rotor 54 rotates to move the slot 56 beyond the angular position 42, the switch 58 changes state to indicate over travel.

As discussed for the RVDT 12, the resolver 52 may be coupled to the rotary component through one or more gears to translate the rotation of the rotary component into a rotation of the resolver rotor 54 within a predetermined angular sensing range of the resolver 52. The resolver 52 may have an angular sensing range above or below 360°. The system 50 may be used to indicate over travel if the rotor 54 rotates outside a range from 0° to just below 360°.

The switch 58 may be any type of contact or non-contact switching device that can change state when the rotor 54 rotates to align the slot 56 with the switch 58. For example, a mechanical switch, such as a microswitch, or an optical switch may be used with the resolver to detect over travel. The switch 58 may comprise a spring loaded element that maintains contact with the rotating surface of the rotor 54 and is urged into the slot 56 when the slot 56 and switch 58 are aligned to change the state of the switch 58 and detect over travel.

Though the system 50 is shown in FIG. 3 with only one switch 58 and one slot 56, any number of switches 58 positioned around the rotor 54 may be used to detect any number of slots 56 at various angular positions in the surface of the rotor 54. This may depend on the angular sensing range of the resolver 52, and/or the normal travel of the rotary component. For example, a single switch 58 may be used to detect two slots 56 at different angular positions, or two switches 58 angularly spaced from each other around the rotor 54 may be used to detect a single slot 56 as the rotor 54 rotates. Using a greater number of switches 58 and/or slots 56 may increase the precision of the over travel detection.

Other types of singularities or features of the rotor 54 that are suitable for changing the state of the switch 58 may be used in place of the slot 56. The switch 58 and rotor 54 may be provided in a cam arrangement to activate the switch 58 via a cam profile as the rotor 54 is rotated. For example, the switch 58 may comprise a cam follower and the slot 56 is replaced by a cam profile of the rotor 54 that changes the state of the switch 58 via movement of the cam follower.

The device of the present invention may comprise other types of angular position sensors instead of the RVDT and resolver. For example, an optical rotary encoder may be used, wherein an independent optical switch is activated by one or more additional slots or holes at a different radius to the main sensor slots of the optical rotary encoder.

Figure 4:
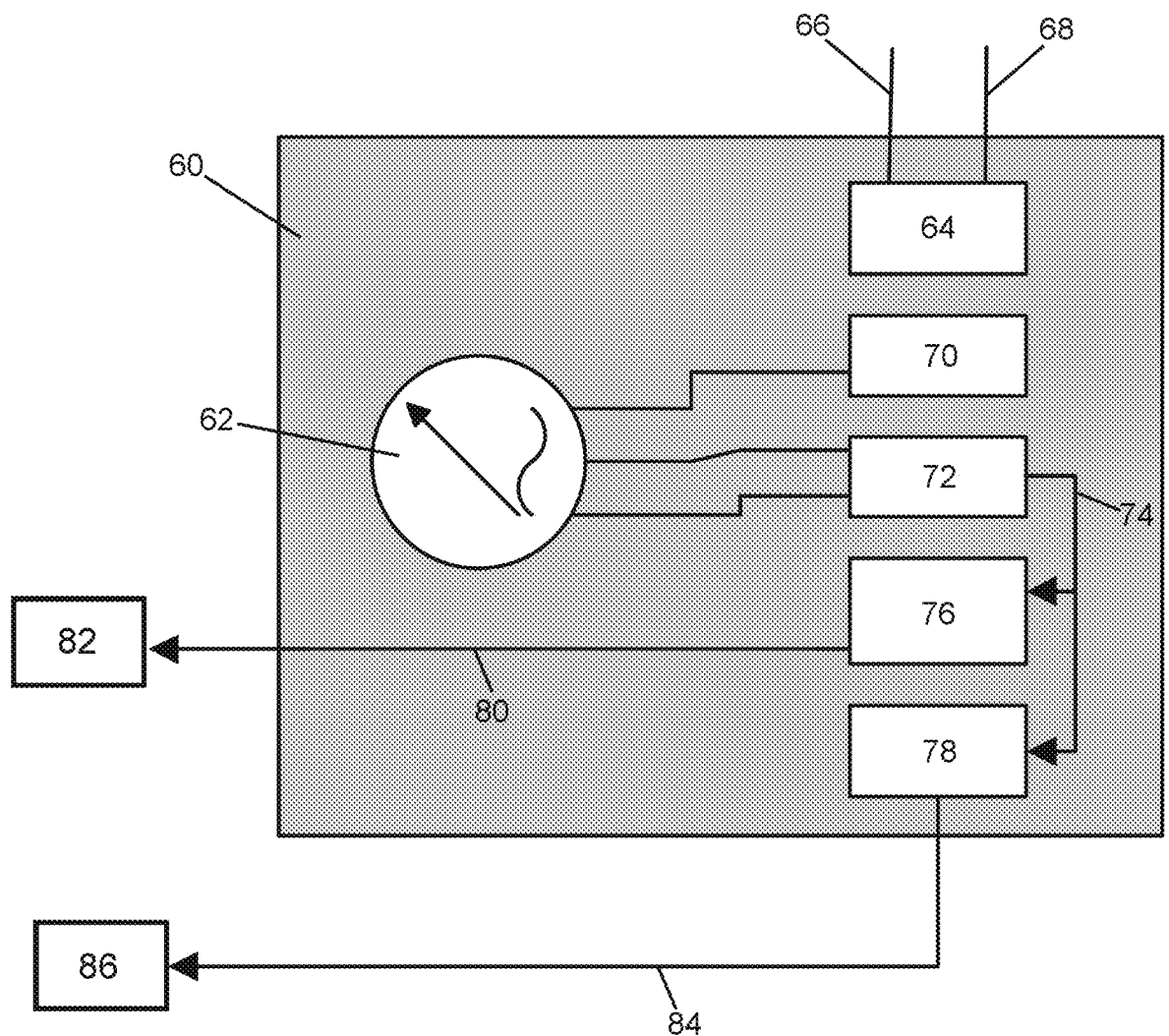
FIG. 4 is a schematic representation of a system for preventing over travel according to another embodiment of the present invention.

Referring now to FIG. 4, a smart device 60 for over travel detection is described that operates differently to the mechanical systems described above. That is, the smart device 60 taps the signals that are sent to the central controller in order to detect a likely over travel event.

The device 60 comprises an angular position sensor 62, for example an RVDT or a resolver. The device 60 comprises a power supply 64, power lines 66 and 68 and a signal generator 70. The signal generator 70 can produce the driving signal (i.e., AC voltages) for operating the angular position sensor 62. The feedback signals from the angular position sensor 62 are received by a converter 72 that calculates the angle or number of turns travelled by the rotary component and outputs this as a digital rotation signal through line 74.

The rotation signal is received by a databus node 78, which sends the rotation signal from the converter 72 through signal line 84 to the central control system 86 for monitoring and/or controlling the rotation of the rotary component.

The device 60 comprises a travel limit function 76 that taps the rotation signal sent through line 74. The travel limit function 76 may comprise a processor which runs a logic program to change the state of a signal line 80 if the rotation signal indicates over travel of the rotary component. The signal line 80 is in communication with a secondary device 82 which may be activated by the detection of over travel, or use the detection of over travel to generate a command. The secondary device 82 may correspond to the secondary device 34 discussed above with reference to FIG. 2, and thus may provide a stopping function to prevent further rotation of the rotary component. The device 82 may be a brake that is activated by the change in state of the signal line 80 to prevent further rotation of the rotary component, for example when the voltage on the signal line 80 is increased or decreased beyond a threshold value.

It will be appreciated that the travel limit function 76, the change in state of the signal line 80, and the subsequent operation of the secondary device 82 operate independently of the central control system 86, and so are not affected by an errors/malfunctions within the central control system 86. The travel limit function 76 can react to an over travel event based directly on the output of the sensor 62, and does not require a command from the central control system 86. The smart device 60 essentially uses a modification of the conventional system that includes the travel limit function 76, signal line 80 and brake 82, which permits the existing rotation signal to be tapped and used to prevent undesired rotation of the rotary component.

The smart device 60 only requires input through the power supply lines 66, 68 and output through the signal line 80 to the device 82 and the signal line 84 to the central control system 86. By including the sensor signal conversion and travel limit function 76 within the smart device 60, the smart device 60 has a reduced wiring requirement compared to standard angular position sensing systems, and is an elegant way of providing an independent signal to indicate and/or prevent over travel of a rotating component.

The invention claimed is:

1. A system for detecting rotational over travel, the system comprising:
    an angular position sensor for measuring an angular position of a rotary component, the angular position sensor comprising a rotor rotatable about an axis, the angular position sensor configured to output one or more electrical signals to indicate an angular position of the rotor about the axis and/or a number of turns completed by the rotor about the axis; and
    a device comprising a first operating mode and a second operating mode and configured to transition from the first operating mode to the second operating mode in response to the rotor rotating beyond at least one angular position threshold, wherein the transition from the first operating mode to the second operating mode is independent of the one or more electrical signals;
    wherein the device comprises at least one switch arranged within the angular position sensor, the at least one switch comprising a first state corresponding to the first operating mode and a second state corresponding to the second operating mode, and arranged such that the rotor of the angular position sensor can change the at least one switch from the first state to the second state when the rotor of the angular position sensor rotates beyond the at least one angular position threshold;

wherein a transition from the first operating mode to the second operating mode is independent of the one or more electrical signals output by the angular position sensor;

wherein, in the second operating mode, the device is configured to transmit or vary a signal to indicate that the rotor of the angular position sensor has rotated beyond the at least one angular position threshold.

2. The system of claim 1, wherein the at least one switch comprises a first switch arranged such that the rotor of the angular position sensor can change the first switch from the first state to the second state when the rotor of the angular position sensor rotates beyond a first angular position threshold, and a second switch arranged such that the rotor of the angular position sensor can change the second switch from the first state to the second state when the rotor of the angular position sensor rotates beyond a second angular position threshold.

3. The system of claim 1, wherein the angular position sensor is a resolver and the rotor of the angular position sensor comprises at least one slot configured to change the at least one switch from the first state to the second state when the at least one slot and at least one switch are rotationally aligned.

4. The system of claim 1, wherein the at least one switch comprises a mechanical switch configured to change from the first state to the second state through contact with the rotor of the angular position sensor.

5. The system of claim 1, wherein the at least one switch comprises an optical switch.

6. The system of claim 1, wherein the signal is an electrical signal and, in the second operating mode, the device is configured to increase or decrease a voltage of the signal beyond a voltage threshold to indicate that the rotor of the angular position sensor has rotated beyond the at least one angular position threshold.

7. A system for preventing over travel of a rotary component, the system comprising:

the system of claim 1; and a braking device for preventing rotation of a rotary component, wherein the braking device is in communication with the device for receiving the signal, and is configured to be activated in response to the transmission or variation of the signal.

8. A rotary system for preventing over travel, the rotary system comprising:

a shaft configured to rotate about a longitudinal axis; and the system of claim 7, wherein the rotor of the angular position sensor is configured to be driven by the shaft such that the one or more electrical signals indicate an angular position of the shaft about the longitudinal axis and/or the number of turns completed by the shaft about the longitudinal axis, wherein, when activated, the braking device stops or slows rotation of the shaft.

9. A method of detecting over travel of a rotating component, the method comprising:

detecting an angular position of the component and/or a number of turns completed by the rotating component using an angular position sensor, wherein the angular position sensor comprises a rotor driven by the rotating component;

outputting, with the angular position sensor, one or more electrical signals indicating the angular position of the component; and transitioning a device from a first operating mode to a second operating mode in response to the rotor of the angular position sensor being driven by the rotating component beyond at least one angular position threshold, wherein the transition from the first operating mode to the second operating mode is independent of the one or more electrical signals;

wherein the device comprises at least one switch arranged within the angular position sensor, the at least one switch comprising a first state corresponding to the first operating mode and a second state corresponding to the second operating mode, and arranged such that the rotor of the angular position sensor can change the at least one switch from the first state to the second state when the rotor of the angular position sensor rotates beyond the at least one angular position threshold;

wherein a transition from the first operating mode to the second operating mode is independent of the one or more electrical signals output by the angular position sensor;

wherein, in the second operating mode, the device is configured to transmit or vary a signal to indicate that the rotor of the angular position sensor has rotated beyond the at least one angular position threshold.

10. The method of claim 9, further comprising activating a brake to stop or slow rotation of the component in response to the transmission or variation of the signal.

* * * * *